No. 851,383. PATENTED APR. 23, 1907.
H. R. SHAFER.
SKIRT TRIMMER.
APPLICATION FILED OCT. 15, 1906.
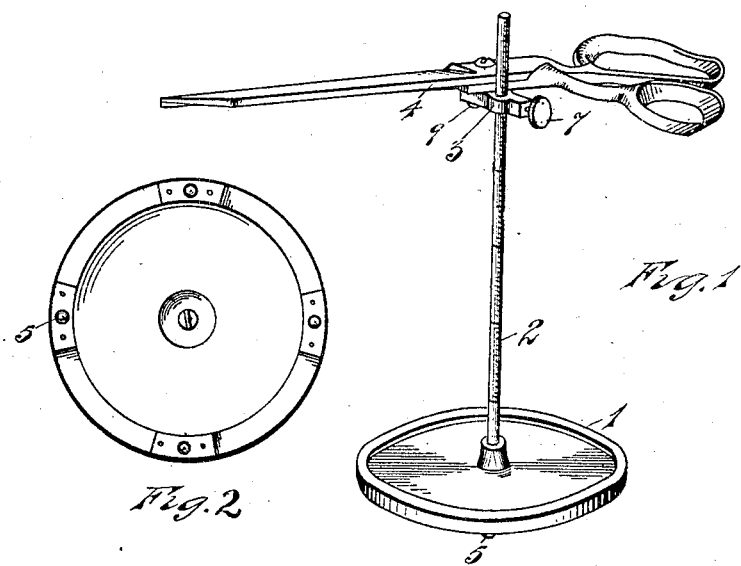
WITNESSES
INVENTOR
Homer R. Shafer
By Parker A. Burton
Attorneys.

UNITED STATES PATENT OFFICE.

HOMER R. SHAFER, OF DETROIT, MICHIGAN.

SKIRT-TRIMMER.

No. 851,383.  Specification of Letters Patent.  Patented April 23, 1907.

Application filed October 15, 1906. Serial No. 338,949.

*To all whom it may concern:*

Be it known that I, HOMER R. SHAFER, a citizen of the United States, residing at Detroit, county of Wayne, State of Michigan, have invented a certain new and useful Improvement in Skirt-Trimmers; and I declare the following to be a full, clear, and exact description of the same, such as will enable others skilled in the art to which it pertains to make and use the same, reference being had to the accompanying drawings, which form a part of this specification.

This invention relates to skirt trimmers; it has for its object an improved implement for trimming and hanging ladies skirts.

In the drawings:—Figure 1, shows the trimmer in perspective. Fig. 2, is a view of the bottom of the base.

A base 1, supports a standard 2, upon which is secured adjustably an arm 3, and to the arm is pivotally supported a shears or cutting implement 4. The base is mounted upon small ball casters 5. The standard 2 is preferably graduated so that it may be adjusted to any height and readjusted to the same height at any subsequent period. The adjustment is made by moving the arm 3 vertically along the standard and securing it in the selected place by a set-screw 7, which engages through the arm against the standard 2. The shears 4 are held by a pivot 9 to the arm 3, and are supported horizontally or in a plane parallel to the bottom plane of the base 1.

What I claim is:—

1. An implement for trimming skirts, having, in combination, a portable base mounted on casters, a standard rising therefrom, an arm through which said standard engages, a set screw engaging therethrough against said standard whereby it may be locked in position at any desired point along said standard, and a pair of shears pivotally supported by said arm with its cutting members held in a horizontal plane, substantially as described.

2. An implement for trimming skirts, having, in combination with a vertical standard, a supporting base therefor, an arm slidable with respect to said standard and adapted to be locked in position at any point therealong, and a pair of shears pivotally supported by said arm with its cutting blades in permanent horizontal position, substantially as described.

In testimony whereof, I, sign this specification in the presence of two witnesses.

HOMER R. SHAFER.

Witnesses:
 LOTTA LEE HAYTON,
 CHARLES F. BURTON.